(12) United States Patent
Girondi

(10) Patent No.: US 9,731,236 B2
(45) Date of Patent: Aug. 15, 2017

(54) FILTER CARTRIDGE AND FILTER GROUP WITH WATER SENSOR FIXED TO THE FILTER CORE

(71) Applicant: UFI FILTERS S.P.A., Porto Mantovano (MN) (IT)

(72) Inventor: Giorgio Girondi, Mantova (IT)

(73) Assignee: UFI FILTERS S.P.A., Porto Mantovano (MN) (IT)

( * ) Notice: Subject to any disclaimer, the term of this patent is extended or adjusted under 35 U.S.C. 154(b) by 0 days.

(21) Appl. No.: 15/121,299

(22) PCT Filed: Feb. 5, 2015

(86) PCT No.: PCT/IB2015/000129
§ 371 (c)(1),
(2) Date: Aug. 24, 2016

(87) PCT Pub. No.: WO2015/128711
PCT Pub. Date: Sep. 3, 2015

(65) Prior Publication Data
US 2017/0065916 A1   Mar. 9, 2017

(30) Foreign Application Priority Data
Feb. 27, 2014   (IT) .............................. RE2014A0015

(51) Int. Cl.
*B01D 36/00* (2006.01)
*F02M 37/22* (2006.01)
(Continued)

(52) U.S. Cl.
CPC ......... *B01D 36/005* (2013.01); *B01D 35/005* (2013.01); *B01D 35/143* (2013.01); *F02M 37/221* (2013.01); *B01D 2201/29* (2013.01)

(58) Field of Classification Search
CPC .... B01D 17/06; B01D 46/0078; B01D 35/06; B01D 46/4245
See application file for complete search history.

(56) References Cited

U.S. PATENT DOCUMENTS

2004/0069694 A1* 4/2004 Gamble ............... B01D 36/005 210/85
2007/0079653 A1* 4/2007 Zuleta .................... G01F 23/26 73/304 R
(Continued)

FOREIGN PATENT DOCUMENTS

EP           1277948 A2     1/2003
KR      20030025333 A  *    3/2003

*Primary Examiner* — Katherine Zalasky
*Assistant Examiner* — Ryan B Huang
(74) *Attorney, Agent, or Firm* — Volpe and Koenig, P.C.

(57) ABSTRACT

A filter cartridge (40) for filtering a fluid comprising a tubular filter wall (43) and at least a longitudinal core (45) inserted axially in the internal cavity of the filter wall (43), made of at least an electrically insulating material and provided with a plurality of radial openings (450), comprising at least a conductive strip (50), realized in an electrically conductive material, fixed to the longitudinal core and provided with at least a first portion (51) exposed from the longitudinal core externally of the internal cavity of the filter wall (43) and a second portion (52) exposed from the longitudinal core and axially located at a different height with respect to the first portion (51).

16 Claims, 3 Drawing Sheets

(51) Int. Cl.
*B01D 35/00* (2006.01)
*B01D 35/143* (2006.01)
*B01D 46/00* (2006.01)
*B01D 29/58* (2006.01)

(56) References Cited

U.S. PATENT DOCUMENTS

2010/0000916 A1 1/2010 Eberle et al.
2013/0285678 A1* 10/2013 Gwin .................... B01D 36/005
                                                    324/656

* cited by examiner

FILTER CARTRIDGE AND FILTER GROUP WITH WATER SENSOR FIXED TO THE FILTER CORE

TECHNICAL FIELD

The present invention relates to a filter group and a relative filter cartridge for filtration, for example of diesel fuel, in the automotive field.

In greater detail, the invention relates to a filter group provided with a sensor of the presence of water in diesel fuel and the relative filter cartridge.

BACKGROUND

As is known, the filtration of diesel in the motoring sector is generally obtained with a group that comprises an external casing provided with a substantially beaker-shaped body, the open end of which is closed by a cover. At least one from between the cover and the beaker-shaped body is provided with an inlet for the diesel to be filtered and an outlet of the filtered diesel. A filter cartridge is contained internally of the casing, which filter cartridge is suitable for sub-dividing the internal volume of the casing into two distinct chambers, of which a first chamber is in communication with the inlet and a second chamber communicates with the outlet. In this way, the diesel flowing from the inlet towards the outlet of the filter group is forced to cross the filter cartridge, which retains the impurities that might be present therein.

A certain quantity of water is also present in the diesel, which due to the greater specific weight thereof with respect to the specific weight of the fuel to be treated (for example diesel oil) tends to accumulate on the bottom of the beaker body and must therefore be eliminated during the functioning of the filter group.

In the prior art, for facilitating the separation of the water from the fuel, filter walls are generally used which are able to separate the water by coalescence from the fuel and/or hydrophobic nets which keep the water separated from the fuel, so that the water collects by force of gravity on the bottom of the casing.

Further, also known is the use of discharge conduits associated to the casing of the filter group which place the lower part of the casing, where the water tends to collect, in communication with discharge means and/or aspirating means of the water, so that the accumulated water is constantly emptied from the casing.

To detect the presence of accumulated water in the casing, with the aim of preventing the level of water from exceeding a predetermined maximum level and so that it cannot therefore be accessed and sent into the combustion chamber, there are sensors present (known as water in fuel sensors) which are associated to the casing in such a way that a sensitive part of the sensor is located in proximity of the bottom thereof.

The sensors detecting the presence of water are operatively connected to the electronic board of the vehicle and are configured so as to generate an alarm signal in a case where the water reaches the maximum level, which generally corresponds to the level at which the sensitive part of the sensor is located internally of the casing.

When the alarm signal is generated it is sufficient to empty the water present on the bottom of the casing via the discharge conduit.

The water presence sensors in practice comprise an electric circuit that can terminate with one or more uncovered electrodes, which are the sensitive part of the sensor and are configured to be arranged internally of the casing and immersed in the fluid being filtered.

The level the water has reached in the casing is calculated from the measurement of the conductivity of the liquid about the electrodes, which is different if the electrodes are immersed in the diesel or in water.

There exist water presence sensors the electrodes of which are fixed to the bottom of the casing or which are fixed to the lower end of a longitudinal stem which branches from the upper cover of the casing.

A drawback encountered in the filter groups of known type, in which the water presence sensor is integrated in the casing, is the fact that a non-original filter cartridge or a cartridge arranged wrongly internally of the casing might obscure the sensor or render it ineffective.

Lastly, a drawback encountered in known filter groups relates to the fact that the water level sensor is located at an height independently of the filter cartridge, and might therefore be located at a greater height with respect to the level of the lower support plate of the filter cartridge and therefore at a level corresponding to a sector of the filter wall, which would therefore be wetted by the water that accumulates on the bottom.

An aim of the present invention is to obviate the above-mentioned drawbacks in the prior art, with a solution that is simple, rational and relatively inexpensive.

The above aims are attained by the characteristics of the invention reported in the independent claim. The dependent claims delineate preferred and/or particularly advantageous aspects of the invention.

DESCRIPTION OF THE INVENTION

In particular the invention discloses a filter cartridge for filtering a fluid comprising a filter wall having a tubular shape and at least a longitudinal core inserted axially into the internal cavity of the filter wall, made of at least an electrically-insulating material and provided with a plurality of radial openings.

In the invention, the filter cartridge comprises at least a conductive strip made of an electrically conductive material, fixed to the longitudinal core and provided with at least a first portion exposed from the longitudinal core projecting axially externally of the internal cavity of the filter wall and a second portion exposed from the longitudinal and axially located at a different height with respect to the first portion, for example arranged internally of the internal cavity of the filter wall or at most projecting axially out of the internal cavity of the filter wall on an opposite side with respect to the first portion.

For example the second exposed portion is configured to come into contact with an exposed electrical contact immersed in the fluid being filtered (diesel fuel) of a water level sensor while the first exposed portion is configured to come into contact first with the water that has separated from the fluid being filtered, the level of which rises axially following accumulation thereof below the fluid being filtered.

Thanks to this solution, the position of the water level sensor inside the casing of a filter group can be dissociated from the maximum level that the water accumulating on the bottom of the casing is allowed to reach.

Further, with this solution the conductive strip can be configured in such a way that it axially prolongs the water level sensor immersed in the fluid being filtered, such that the first exposed portion of the conductive strip, which is surely located at a lower level with respect to all the filter wall, is able to detect the reaching by the water in the casing of the filter group of a certainly lower level with respect to all the filter wall, thus preventing direct contact between the water and the filter wall and the water with the level sensor (which will always and only be immersed in the fluid being filtered).

With this solution it is also possible to limit the axial dimensions of the water level sensor, with considerable advantages in terms of accuracy of the detecting and the stability.

The conductive strip advantageously comprises an elongate body arranged with the longitudinal axis substantially parallel to the longitudinal axis of the longitudinal core.

With this solution the conductive strip is easily realisable and rapidly installable on the longitudinal core.

An advantageous aspect of the invention further includes the filter cartridge comprising at least a pair of conductive strips, for example separate from one another and electrically isolated.

With this solution, the conductive strips are configured to be a simple prolongation internally of the casing of the exposed electrical contacts of the water level sensor.

Alternatively the conductive strips of the pair of conductive strips can be electrically connected to one another by means of at least a resistor, for example at least partially also fixed to the longitudinal core.

With this solution it is possible to simplify the water level sensor structure, making it possible for it to diagnose the water level through the electrical resistance offered to the resistor incorporated in the filter cartridge.

Further, thanks to this solution, using the same water level sensor it is possible to determine the presence of the correct filter cartridge (i.e. the filter cartridge originally designed for the filter group), as well as the correct positioning thereof in the filter group, for example making the use of non-original replacement parts less easy.

In both the above variants, a further advantageous aspect of the invention can comprise the first exposed portions of the conductive strips of the pair of conductive strips being axially at a same height, while the second exposed portions of the conductive strips of the pair of conductive strips are axially at different heights.

With this solution the two electrodes defined by the conductive strips can be distinguished.

In a still further aspect of the invention the conductive strip can exhibit at least a portion, for example an intermediate portion between the exposed portions, having a longitudinal axis substantially arranged in a radial direction that is sunk or inserted in the longitudinal core.

In a further aspect of the invention the longitudinal core is removably associated to the filter wall.

Further, the longitudinal core can be able to support at least a net (hydrophobic) for separating the water from the diesel fuel, such as to occlude the radial openings or alternatively being able to directly support the filter wall.

A further aspect of the invention discloses a filter group comprising:

an external casing provided with at least an inlet of a fluid to be filtered, and at least an outlet of the fluid to be filtered;

a filter cartridge, according to any one of the preceding claims, contained internally of the casing, such that the filter wall is crossed by the fluid which flows from the inlet towards the outlet and the first exposed portion of the conductive strip is the lower end of the conductive strip proximal to the bottom of the casing, and at least an electrical contact of a water sensor in the diesel fuel associated to the casing.

With the invention, the second exposed portion of the conductive strip is able to come into contact with the at least an electrical contact, when the filter cartridge is contained internally of the casing, in such a way that the conductive strip axially prolongs the electrical contact.

With this configuration of the filter cartridge and the filter group it is possible to attain the above-detailed advantages.

Further and advantageously, the electrical contact is supported by a stem inserted in the internal cavity of the longitudinal core.

In a further advantageous aspect of the invention, the electrical contact or the second exposed portion comprise an annular body realised in electrically conductive material.

With this solution, the orientations (internally of the casing) of the water level sensor and of the filter cartridge are completely independent.

In a further aspect of the invention the water level sensor in the diesel fuel can comprise a pair of the electrical contacts electrically isolated from one another.

The electrical contacts of the pair of electrical contacts are advantageously axially located at different heights internally of the casing, so as to be easily distinguishable regardless of the orientation of the water level sensor internally of the casing.

In a further aspect of the invention, that can be protected also independently from what is described above, discloses a water level sensor in the diesel fuel, for example associable to a filter group of the diesel fuel, which comprises a stem supporting at least an electrical contact exposed from the stem, in which the electrical contact comprises at least an annular body defining an exposed surface developing circumferentially.

With this solution, the orientation of the water level sensor in the filter group is independent of the orientation of the filter cartridge.

In a further aspect of the invention, also protectable independently from the above, a water level sensor of the water in the diesel fuel is provided, for example associable to a filter group of the diesel fuel, which comprises a stem supporting at least a pair of electrical contacts exposed by the stem and electrically isolated, in which the electrical contacts are located at axial levels (staggered) that are different along the stem.

With this solution it is possible to distinguish the two defined electrodes of the sensor level regardless of the orientation of the sensor in the filter group.

BRIEF DESCRIPTION OF THE DRAWINGS

Further characteristics and advantages of the invention will emerge from a reading of the following description provided by way of non-limiting example, with the aid of the figures illustrated in the appended tables.

DETAILED DESCRIPTION OF THE PREFERRED EMBODIMENTS

Figure 1:
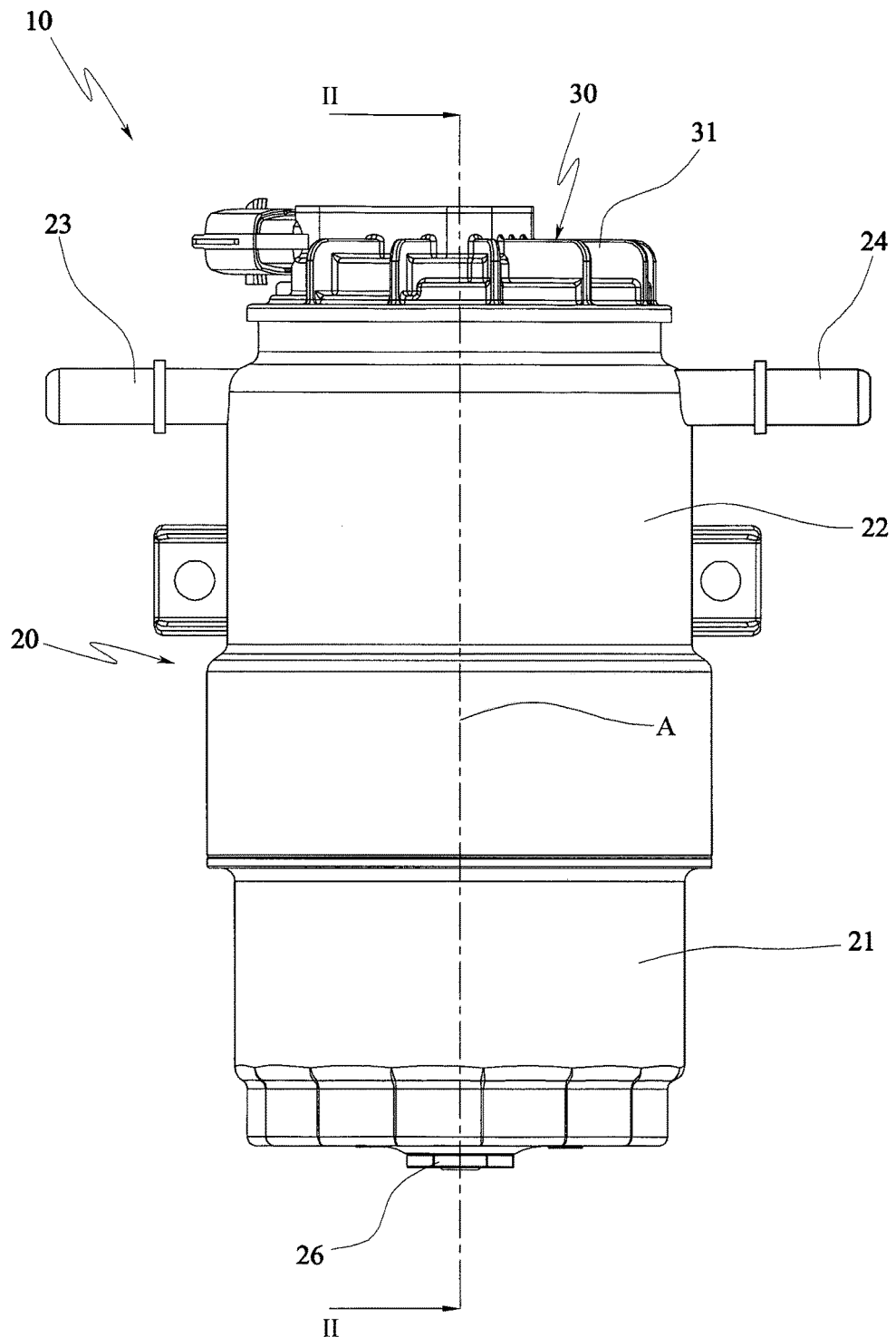
FIG. 1 is a front view of a filter group according to the invention.
Figure 2:
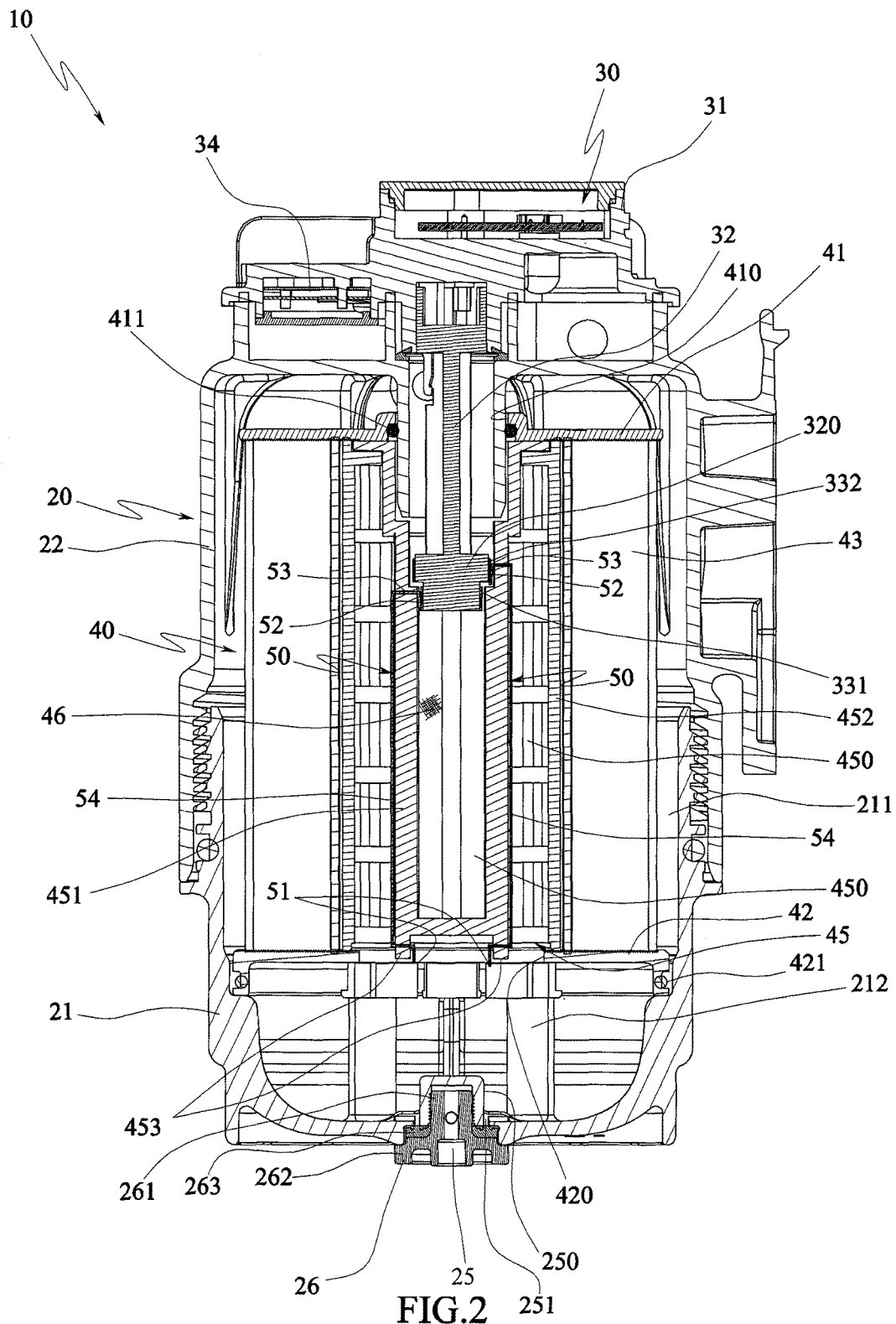
FIG. 2 is a section view along section line II-II of FIG. 1.

In the figures, reference numeral 10 denotes in its entirety a filter group 10 for filtration of fluids, in particular diesel fuel in a diesel engine of a motor vehicle.

The filter group 10 comprises an outer casing, generally denoted by 20, which includes, for example, a beaker-shaped body 21, and a cover 22 suitable for closing the beaker-shaped body 21.

The cover 22 comprises an inlet conduit 23 for the diesel to be filtered and an outlet conduit 24 for the filtered diesel.

The beaker-shaped body 21 comprises, for example positioned at the bottom thereof, a discharge conduit 25 for the water that accumulates on the bottom of the beaker-shaped body 21, provided with a connecting cap 26 which will be better described in the following.

The filter group 10 includes a water level sensor 30, which could also be protected independently, and which for example comprises a plate-shaped head 31 (for example, disc-shaped and not indispensable) from which a stem downwardly extends 32, which stem internally supports an electronic circuit and which bears at a lower end thereof at least an exposed electrical contact and at a lower end of which bears at least an exposed electrical contact 331, 332.

In the present example two electrical contacts 331, 332 are illustrated.

The electrical contacts 331, 332 of the water level sensor 30 are substantially axially staggered with respect to one another, i.e. are located in different axial positions along the longitudinal axis of the stem 32.

For example, the electrical contacts 331, 332 are located at different heights internally of the casing 20.

In the example the electrical contacts 331, 332 are superposed on one another and axially separated by an annular strip of electrically-insulating material.

At least an electrical contact 331, 332 (in the example both) is for example realized by an annular body of conductive material coaxial with the stem 32.

The whole external wall of each annular body is exposed by the stem 32, i.e. the electrical contact 331, 332 can be contacted along the whole external circumference thereof without any preferential orientation.

In the example the lower electrical contact 331, i.e. the contact located proximally to the free end of the stem 32, exhibits a smaller diameter with respect to the upper electrical contact 332, i.e. the contact located distally of the free end of the stem 32.

In particular, the upper electrical contact 332 is fixed externally of an annular broadening 320 of the stem 32 of a greater diameter with respect to the end portions of the stem 32.

There could be only one electrical contact 331, 332 or more than two electrical contacts 331, 332, according to the functioning of the electronic circuit.

The water level sensor 30 is configured to detect the level of water that accumulates on the bottom of the beaker-shaped body 21 during filtration of diesel fuel and is associated, as known to a technician of the sector, to an electronic control unit (not shown) of the vehicle.

In the illustrated example the water level sensor 30 is fixed to the cover 22, for example so that the plate-shaped head 31 is arranged externally of the casing 20 and the rod 32 projects inside the casing itself, for example through a special hole made in the cover 22.

In practice, the stem 32 can be substantially coaxial with the casing 20.

Further, each electrical contact 331, 332 can be arranged in the casing 20 so that it is immersed in the diesel fuel being filtered, for example at an intermediate height of the beaker body 21, at a distance from the bottom thereof.

A heater element 34 (such as an electric heater) can be housed, for example, inside the plate-shaped head 31 (or in the stem), suitable for heating the diesel contained in the casing 20, for example during the first moments of engine operation.

However, the water level sensor might alternatively branch from the bottom of the beaker-shaped body 21.

A filter cartridge, denoted in its entirety by 40, is accommodated internally of the casing 20, which filter cartridge 40 comprises a filter wall 43 having a tubular shape.

For example, the cartridge 40 comprises an upper support plate 41 and a lower support 42 plate, which are fixed to opposite ends of a tubular filter wall 43.

In the illustrated example the filter wall 43 is a pleated wall, which defines and delimits a substantially cylindrical internal volume.

The filter wall 43, alternatively, could be a depth wall, also delimiting a substantially cylindrical internal cavity.

The filter wall 43 can be of a coalescent type in order to improve the separation of water from the diesel fuel.

The upper support plate 41 is substantially disc-shaped and has a central hole 410 centered on the longitudinal axis A of the filter wall 43.

The lower support plate 42 is also substantially disc-shaped and has a central hole 420 centered on the longitudinal axis A of the filter wall 43.

The lower support plate 42 and the upper support plate 41 are in particular made of at least an electrically insulating material, such as a plastic material.

The central hole 410 of the upper support plate 41 is inserted on the internally-projecting portion to the beaker body 21 of the stem 32, so that the electrical contacts 331, 332 are, in use, located internally of the internal cavity of the filter wall 43.

Further, the central hole 410 of the upper support plate 41 inserts on an terminal internal portion of the outlet conduit 24, which is able to accommodate the upper portion of the stem 32 with radial play.

A seal ring 411 is interposed between the internal end portion of the outlet conduit 24 and the internal edge of the central hole 410 of the upper support plate 31, which seal ring 411 is fixed to the internal edge of the central hole 410, such that the internal volume of the filter cartridge 40 communicates exclusively with the outlet conduit 24.

The free end of the stem 32 is arranged, for example internally of the internal cavity of the filter wall 43.

The lower support plate 42 enters and rests on the bottom of a cylindrical seating fashioned in proximity of the bottom of the beaker-shaped body 21 (at a distance therefrom) by interposing of a further seal ring 421 which subdivides, together with the seal ring 411, the internal volume of the casing 20 into two distinct chambers 211, 212, subdivided by the filter wall 43, of which a first chamber 211 of the diesel to be filtered (in the external example external and above the filter wall 43 and internal of the casing (20), in communication with the inlet conduit 23, and a second chamber 121 of the filtered diesel (in the example internal and lower than the filter wall 43), in communication with the outlet conduit 24.

In particular, the filter cartridge 40 comprises at least a longitudinal core 45, which is inserted internally of the internal cavity of the filter wall 43.

The longitudinal core 45, for example, comprises a tubular body provided with a plurality of radial openings 450.

In the example the longitudinal core 45 is arranged coaxially and internally of the filter wall 43, and is fixed at an end thereof respectively to one of the upper support plate 41 and the lower support plate 42.

The longitudinal core 45 is for example made of at least an electrically-insulating material, such as a plastic material.

In the preferred embodiment the filter cartridge 40 comprises two longitudinal cores 451, 452, of which a first longitudinal core 451 able to support a hydrophobic net 46, for example also tubular in shape, coaxially inserted in the filter wall 43, so as to intercept the flow of fuel crossing the filter wall from the inlet conduit 23 to the outlet conduit 24.

A second core 452 is able to support the filter wall 43.

The second core 452 comprises a substantially tubular body having a substantially equal diameter (or slightly smaller) than the internal diameter of the filter wall 43.

The second core 452 comprises a plurality of radial openings 450, separate from one another by axial walls (for example equidistant) and perpendicular coaxial rings (for example equidistant).

The opposite ends of the second longitudinal core 452 are both open and respectively fixed, for example by means of gluing or welding, to the internal faces (reciprocally facing) of the upper support plate 41 and the lower support plate 42.

The second longitudinal core 452 comprises an internal annular shelf at the upper end thereof.

The first longitudinal core 451 comprises a substantially tubular body provided with a plurality of radial openings 450, separated from one another by axial walls (for example equidistant in the figure and four in number).

The first longitudinal core 451 exhibits an external diameter that is smaller than the internal diameter of the second longitudinal core 452 so as to be inserted, for example coaxially, internally thereof.

The first longitudinal core 451, in the example, comprises an open end (upper) and the opposite end (lower) closed by a disc-shaped wall.

The hydrophobic net 46, also substantially tubular in shape, internally or externally (in the illustrated example externally) binds the axial wall of the first longitudinal core 451 (at least an axial portion thereof which goes from the lower closed end up to in proximity of the upper open end).

The open upper end of the first longitudinal core 451 comprises a broadened disc-shaped edge which can be interposed between the annular shelf of the second longitudinal core 452 and the internal face (lower) of the upper support plate 41 and be constrained thereto by a clamp.

In practice, the first longitudinal core 451 is fixed to the second longitudinal core 452 and/or to the filter wall 43 (in the example to the upper support plate 41) solidly or removably, according to needs.

The open upper end of the first longitudinal core 451 is inserted, for example with very little radial play, on the terminal internal portion of the outlet conduit 24, in such a way that the outlet conduit 24 is in fluid communication with the internal chamber of the first longitudinal core 451 (i.e. the internal chamber of the hydrophobic net 46).

Further, the free end of the stem 32 of the water sensor level 30, provided with the electrical contacts 331, 332, is, in use, inserted in the first longitudinal core 451 (i.e. internally of the internal portion of the hydrophobic net 46 of the second chamber 212).

In the example the internal cavity of the first longitudinal core 451 (or in any case the longitudinal core 45) comprises a plurality of vertical-section portions, of which a tapered first lower portion, in which the axial walls exhibit a greater radial thickness, a second intermediate portion, having an internal diameter that is greater than the diameter of the tapered lower portion, for example located at a height from the closed end of the first core 451 comprised between ½ and ⅝ of the length of the first longitudinal core.

The annular broadening 320 of the stem 32 will in use be housed in the second portion, while the free end (tapered) of the stem 32 inserts internally of the terminal portion of the first portion.

For example the step between the first portion and the second portion of the first longitudinal core 451 defines an axial abutment for the stem 32, which can define a stop zone for the annular broadening 320.

At least an appendage 453 (in the example two in number and for example mutually opposite) axially projects downwardly from the closed bottom end of the first longitudinal core 451.

Each appendage 453, for example, is a prolongation (beyond the plane defined by the disc-shaped wall which closes the lower end of the first longitudinal core 451) of an axial wall which defines the first longitudinal core 451.

The free end of each appendage 453 is, for example, located (internally of the casing 20) at a lower level than a level at which the free end (lower) of the filter wall 43 is located.

In practice, each appendage 453 projects below the level of the lower end of the filter wall 43 by at least a limited axial portion.

For the purposes of the present invention, the filter cartridge 40 includes at least a conductive strip 50 made of electrically conductive material, which is fixed to the longitudinal core 45, in the example to the first longitudinal core 451.

Alternatively or additionally, the conductive strip 50 can be fixed to the second longitudinal core 452.

The conductive strip 50 is provided with at least a first portion 51 exposed from the longitudinal core 45 (from the first longitudinal core 451), wherein the first portion 51 axially projects outside of the internal cavity of the filter wall 43, below the filter wall 43.

Further, the conductive strip 50 is provided with at least a second portion 52 exposed from the longitudinal core 45 (from the first longitudinal core 451) which is arranged internally of the internal cavity of the filter wall 43.

By exposed portion is intended a surface of the conductive strip 50 which emerges or projects from the longitudinal core 45 (first longitudinal core 451) and is able to be, in use, immersed in the fluid being filtered, i.e. in the diesel fuel, in direct contact therewith, so as to define an exposed electrical contact.

The conductive strip 50, for example, comprises an elongate body (substantially narrow and slim), for example having a substantially straight longitudinal axis, which is arranged with the longitudinal axis thereof substantially parallel to the longitudinal axis of the longitudinal core 45 (of the first longitudinal core 451).

The second exposed portion 52, for example, is defined internally of the longitudinal core 45 (the first longitudinal core 451).

The second exposed portion 52 of the conductive strip 50 is configured to come into contact with the at least an electrical contact 33 of the water level sensor 30 when the filter cartridge 40 is correctly inserted in the casing 20, axially extending the electronic circuit of the water level sensor 30 to a level (lower) defined by the height at which the first exposed portion 51 is located internally of the casing 20 (up to a predetermined level determined by the length of the conductor strip 50 and/or by the distance of the first exposed portion 51 from the bottom of the casing 20).

In any case, the position of the first exposed portion 51 (the lowest part of it within the casing 20) can define the maximum level reachable by the water in the casing 20 at which the water level sensor 30 is configured to signal a necessary emptying of the filter assembly.

The first exposed portion 51 is therefore located at a lower level than the level at which the lower end of the filter wall 43 is situated, so as to prevent the water accumulating on the bottom of the casing 20 from wetting the filter wall 43.

In a first variant of the invention there can be the use of a single conductive strip 50 as described above, in a case where the water level sensor 30 exhibits a single electrical contact 331, 332.

The case illustrated in the figures shows a second variant of the invention in which the filter cartridge 40 comprises two conductive strips 50 separated from one another, though they can also be in a number of greater than two if necessary.

The two conductive strips 50, for example, are diametrically opposite.

For example, each conductive strip 50 is fixed to one of the axial walls of the first longitudinal core 451, for example co-moulded or jointed or in any case fixed by means of another fixing method (such as gluing or the like).

In particular, the conductive strip 50 is fixed to the axial wall that is axially prolonged by the appendage 453.

The first exposed portion 51 is advantageously fixed to the appendage 453.

In the example, the first exposed portion 51 projects axially by a further axial portion with respect to the appendage 453, in such a way that the first free end is at a level (internally of the casing 20) that is lower with respect thereto.

Each conductive strip 50 comprises at least a substantially radial portion 53, for example obtained by means of a perpendicular bend of the conductive strip 50, which can be sunken or inserted internally of the body of the longitudinal core 45 (of the first longitudinal core 451), for example crossing the longitudinal core 45 from side to side.

In the illustrated example, each conductive strip 50 comprises a pair of radial portions 53, each located in proximity of a respective exposed portion 51, 52.

In particular, a first radial portion (lower) of each conductive strip 50 is incorporated/sunk in one of the appendages, 453, while the second radial portion 53 (upper) of the conductive strip 50 is incorporated/sunk in the axial wall prolonged from the appendage 453, for example at the portion thereof configured to house a respective electrical contact 331, 332 of the water level sensor 30.

In particular, the conductive strips 50 of the pair of conductive strips 50 exhibit a different axial length.

In particular, the first exposed portions 51 of the conductive strips 50 are at a same height, i.e. the distal end from the filter wall 43 thereof is at a same axial distance from the end (lower) of the filter wall 43 from which they project externally, or in other words, the first exposed portions 51 are at a same height internally of the casing 20.

The second exposed portions 52 of the conductive strips 50 are instead at different heights, i.e. the ends of the second exposed portions 52 which are distal from the first exposed portions 51 are at a different axial distance from the respective first exposed portion 51 (or from the lower end of the filter wall 43), or in other words the second exposed portions 52 are at different heights internally of the casing 20.

In practice, a second exposed portion 52 is located higher than the other, so that the second upper exposed portion 52 goes into contact with only the upper electrical contact 332 and the second lower exposed portion 52 goes into contact with only the lower electrical contact 331.

In the illustrated example each electrical contact 331, 332 is for example realised by an annular body made of conductive material coaxial with the stem 32, while each second exposed portion exhibits a circumferentially limited width, though the situation could be inverted, i.e. the second exposed portion 52 of the conductive strip 50 could exhibit an annular body (of electrically-conductive material) while the electrical contact 331, 332 could be a plate exhibiting a substantially limited circumferential width.

The second upper exposed portion 52 is arranged at the second portion of the first longitudinal core 451, for example above the step which delimits the second portion from the first portion of the first longitudinal core 451.

The second lower exposed portion 52 is arranged at the first portion of the first longitudinal core 451, for example immediately below the step delimiting the second portion from the first portion of the first longitudinal core 451.

The second exposed portion 52, like the first exposed portion 51 of each conductive strip 50 is for example a respective end portion of the conductive strip 50.

The upper radial portion 53 of the second upper exposed portion 52 is incorporated/sunk at the second portion of the first longitudinal core 451, for example above the step which delimits the second portion from the first portion of the first longitudinal core 451; in practice, the upper end of the conductive strip 50 is bent substantially on itself into a C-shape, for example with a concavity facing towards the bottom of the casing 20.

The upper radial portion 53 of the second lower exposed portion 52 is incorporated/sunk at the first portion of the first longitudinal core 451, for example immediately below the step delimiting the second portion from the first portion of the first longitudinal core 451; in practice, the upper end of the conductive strip 50 is substantially folded on itself into a C-shape, for example with a concavity facing towards the bottom of the casing 20.

Each conductive strip 50 further comprises an intermediate portion 54 that is straight and arranged with the longitudinal axis thereof substantially axial.

The intermediate portion 54, for example, is incorporated/jointed in a longitudinal seating realized in the axial wall prolonged from the appendage 453 of the first longitudinal core 451; for example the intermediate portion externally flanks the axial wall.

The longitudinal seating can comprise two lateral walls which laterally surround the intermediate portion 54 of the conductive strip 50.

Figure 3:
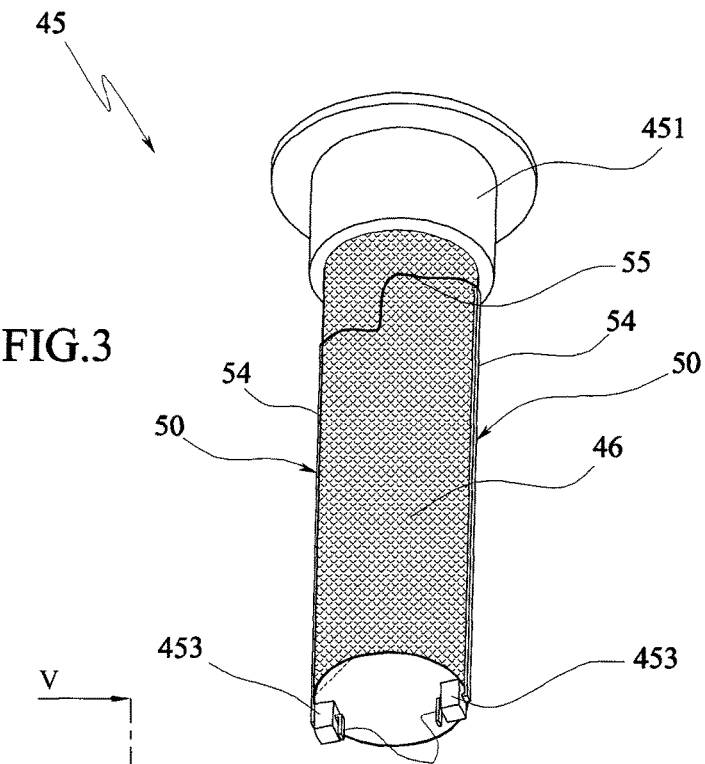
FIG. 3 is an axonometric view of a longitudinal core of a filter cartridge, according to the invention.
Figures 4, 5:
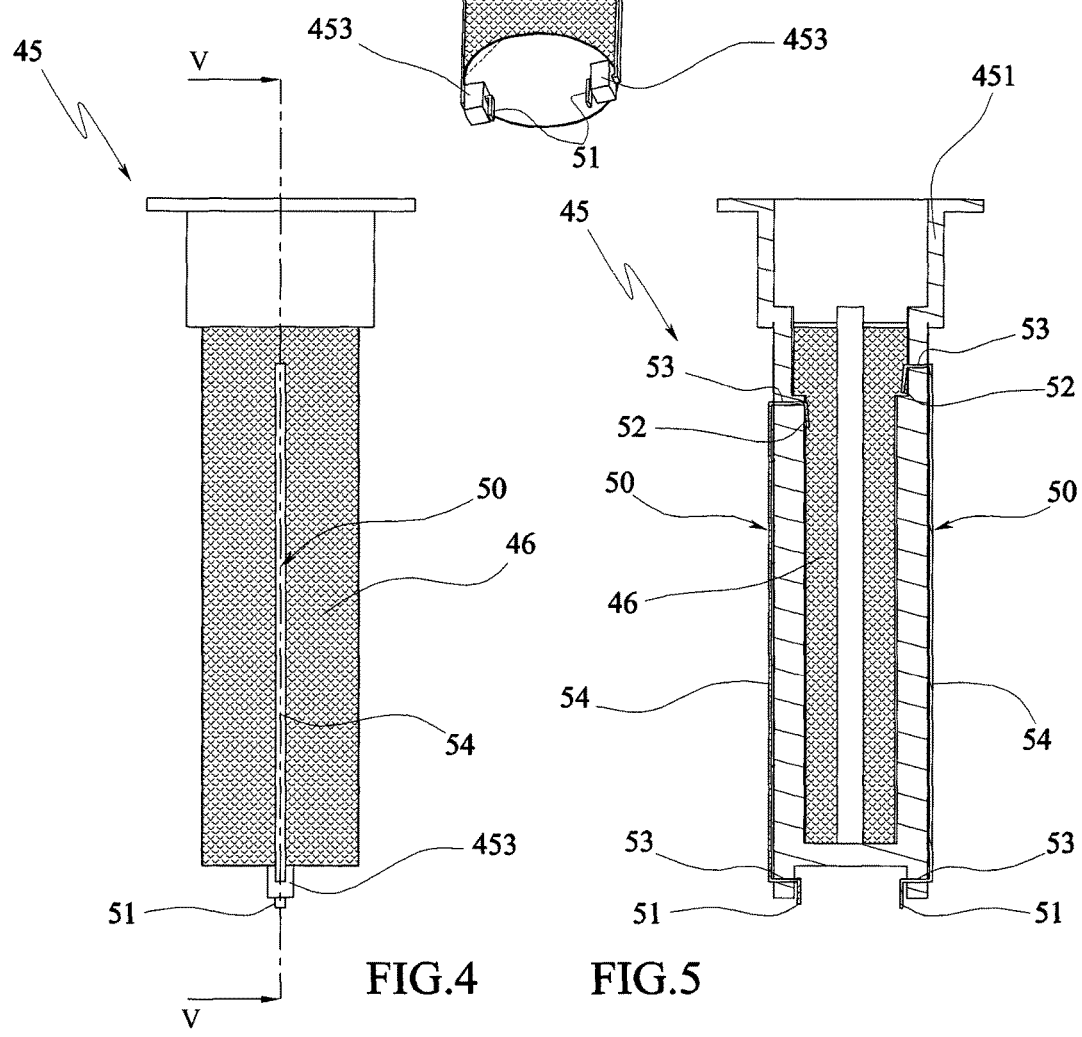
FIG. 4 is a front view of FIG. 3.
FIG. 5 is the section view along section line V-V of FIG. 4.

In an advantageous embodiment, the two conductive strips 50 can be electrically connected to one another by means of at least a resistor 55 (shown only schematically in FIG. 3) which is for example (totally or at least partially) sunk into the longitudinal core 45 (in the first longitudinal core 451).

In the example the resistor 55 is configured so as to provide an electrical difference that is in fact different to both the electrical resistance of the water and the electrical resistance of the diesel fuel.

The resistor 55, for example, comprises a plate, for example made of metal and semi-annular, arranged coaxially with respect to the longitudinal core 45 (to the first longitudinal core 451) and having a diameter comprised between the inner diameter and the outer diameter of the portion of the longitudinal core 45 (first longitudinal core 451) in which it is fixed.

The resistor 55 is for example at least partially sunk in the body of the longitudinal core 45 (of the first longitudinal core 451) and for example by co-molding therewith or by joint-coupling thereto.

The resistor 55 exhibits the opposite ends thereof respectively in contact with a portion of a conductive strip 50, for example with the portion 53 thereof which is also sunk in the longitudinal core 45 (in the first longitudinal core 451).

Lastly, in the illustrated example, the discharge conduit 25 has a substantially cylindrical internal portion 250, coaxial with the beaker-shaped body 21 and rising from the bottom of the beaker-shaped body 21 for a limited axial portion.

The internal portion 250 is internally hollow and is substantially beaker-shaped with the concavity thereof facing on the opposite side with respect to the beaker-shaped body 21.

The internal portion 250 exhibits for example an internal thread for the screwing-in of the connecting cap 26.

The connecting cap 26 is configured to occlude at least a through-hole 251 realized on the bottom of the beaker-shaped body 21, for example in the conjoining zone between the inner tract 250 and the bottom of the beaker-shaped body.

In particular, the bottom of the beaker-shaped body 21 comprises one or more through-holes 252 made in the respective lowered regions of the bottom, arranged about the internal portion 250 and proximal thereto.

In practice, each through-hole 251 is able to place the collection volume 245 in communication with outside the casing 20.

The connecting cap 26 comprises a broadened head 261 from which a threaded stem 262 rises.

The threaded stem 262 can be screwed to the internal thread of the internal portion 250, while the broadened head 261 can be received substantially snugly in a recessed seating of the external wall of the bottom of the beaker-shaped body 21 aligned in plan view with the through-holes 252.

The broadened head 261 comprises a front seal 264 (annular) placed at the base of the threaded rod 262, which is compressible between the external bottom wall of the beaker-shaped body 21 and the upper surface (annular) of the broadened head 261, so as to occlude (substantially sealingly) each through-hole 252 (from outside the casing 20).

The front seal 264 can further comprise a radial lip protruding for ensuring the radial seal between the broadened head 261 and the lateral walls of the recessed seating formed on the bottom of the beaker-shaped body 21.

The broadened head 261 is conformed so as to be able to be screwed and unscrewed from a usual instrumentation.

The connecting cap 26 also comprises at least one water drainage channel 265 defined internally of at least one from between the broadened head 261 and the threaded stem 262.

In practice, the drainage channel 265 exhibits at least an axial portion which opens externally below of the bottom of the broadened head 261, which is connectable to a usual water drain pipe.

The axial portion of the drainage channel 265 extends along the threaded stem 262 and terminates with one or more radial portions open at the outer skirt of the threaded rod 262, for example through radial openings or axial grooves which are placed at a higher level than the level of the front seal 263.

In practice, following a partial unscrewing of the connecting cap 26, the drainage channel is able to place the collecting volume 425 in communication with the exterior of the casing 21 by means of, in sequence: each through-hole 251, the radial portion and the axial portion of the drainage channel itself.

Alternatively, a discharge conduit can also be provided on the cover 22 and be connected to a cannula drawing from the bottom of the beaker-shaped body 21.

In the light of the above, the operation of the filter group 10 is as follows.

To make the filter group 10 operative, the connecting cap 26 is used to occlude firstly the through-holes 251, 252.

Then the filter cartridge 40 is inserted axially into the beaker-shaped body 21 in such a way that the further seal ring 421 rests on the bottom of the cylindrical seating in proximity of the bottom of the beaker body 21.

Then the cover 22 is closed on the beaker body 21, for example by screwing thereon.

By closing the cover 22, the stem 32 of the water level sensor 30 enters the internal cavity of the filter wall 43 and, in particular, the longitudinal core 45 (of the first longitudinal core 45) so that one or both the electrical contacts 331, 332 thereof go into direct contact with the (respective) second exposed portion 52 of one or both the conductive strips 50.

The orientation of the filter cartridge 43 (and/or the longitudinal core 45) is unimportant with respect to the orientation of the water level sensor 30 (of the cover 22), due to the conformation of the electrical contact 331, 332 (and/or of the second exposed portion 52).

The functioning of the water level sensor 30 is different depending on the level sensor used and/or the configuration thereof.

The following contains a description of some operating methods of the water level sensor 30 in combination with the filter cartridge 40 in the filter group 10.

If the water level sensor 30 exhibits a single electrical contact 331 or 332 and the filter cartridge 40 a single conductive strip 50 the operation of the water level sensor 30 is as follows.

The water level sensor 30 always comprises a pair of electrical contacts, of which only one, the electrical contact 33, is immersed in the fluid under filtration and the other is grounded.

Since water has a higher electrical conductivity than diesel oil, if the conductive strip 50 is fully immersed in the diesel, once the electronic circuit is powered-up, the strip 50 measures a first value of current intensity at the heads of the electrical contacts, dependent on the electrical resistance of the diesel.

If the water that accumulates on the bottom of the casing 20 reaches a level such as to intercept, even only partially, an exposed portion 51,52 of the conductive strip 50, the electronic circuit measures, at the heads of the electrical contracts, a second intensity value of the current, dependent on the electrical resistance of the water and, therefore, greater than the first value of current intensity, and signals correspondingly to the control unit the need to proceed to the emptying of the water through the discharge conduit 25.

If the water level sensor 30 has two electrical contacts 33, as in the illustrated case, and the filter cartridge 40 comprises two respective conductive strips 50, the operation of the water level sensor 30 could be the following.

Both the electrical contacts 33 are immersed in the fluid under filtration, as are also the conductive strips 50.

Since water has a higher electrical conductivity than diesel, if both of the conductive strips 50 are immersed in the diesel oil, the electronic circuit, when powered-up, measures a first value of current intensity at the heads of the electrical contacts 331, 332, depending on the electrical resistance of the diesel fuel.

If the water accumulating on the bottom of the housing 20 reaches a level such as to contact, even only partially, the first exposed portions 51 (both being at the same height) of the conductive strips 50, the electronic circuit measures a second current intensity value at the heads of the electrical contacts 331, 332, dependent on the electrical resistance of the water and, therefore, greater than the first current intensity value, and signals correspondingly to the control unit the need to proceed to the emptying of the water through the discharge conduit 25.

Lastly, in a case where the filter cartridge 40 also includes the resistor 55, it places the two conductive strips 50 in connection via an electrical resistance that is different from both the electrical resistance of the water and the electrical resistance of the diesel (for example greater than the electrical resistance of the water).

Therefore, in a case where the casing is empty (or in any case full of diesel oil), the electronic circuit once powered-up measures a reference value of the current intensity at the heads of the electrical contacts 331, 332, dependent on the electrical resistance of the resistor 55 (or also of the diesel).

The electronic circuit and the control unit are configured such as to generate an alarm signal if the intensity value detected is different from the reference value, as this might be a sign for example that the filter cartridge 40 inserted is not the one originally intended for the determined filter group.

In any case, if both of the conductive strips 50 are immersed in the diesel, the electronic circuit when powered-up measures a first value of current intensity at the heads of the electrical contacts 331, 332, dependent on the electrical resistance of the diesel and the resistor 55.

If the water that accumulates on the bottom of the housing 20 reaches a level such as to involve, even only partially, the first exposed portions 51 of the conductive strips 50, the electronic circuit measures a second intensity value current at the heads of the electrical contacts 33, dependent on the electrical resistance of the water and, therefore, greater than the first value of current intensity, and signals correspondingly to the control unit the need to proceed to the emptying of the water through the discharge conduit 25.

The invention thus conceived is susceptible to numerous modifications and variations, all within the inventive concept.

Moreover, all the details are replaceable by other technically equivalent elements.

In practice, the materials employed, as well as the contingent shapes and dimensions, may be any according to requirements without thereby abandoning the scope of protection of the following claims.

The invention claimed is:

1. A filter cartridge (40) for filtering a fluid comprising:
a filter wall (43) having a tubular shape; and
at least a longitudinal core (45) inserted axially in an internal cavity of the filter wall (43), wherein the longitudinal core (45) is made of at least an electrically-insulating material and is provided with a plurality of radial openings (450);
the filter cartridge (40) further comprising:
at least a conductive strip (50), made of an electrically conductive material, wherein the conductive strip (50) is fixed to the longitudinal core (45) and wherein the conductive strip (50) is provided with at least a first portion (51) which axially extends from the longitudinal core (45) outside the internal cavity of the filter wall (43) and a second portion (52) which extends from the longitudinal core (45) and is axially located at a different height with respect to the first portion (51).

2. The filter cartridge (40) of claim 1, wherein the second portion (52) is arranged internally of the internal cavity of the filter wall (43).

3. The filter cartridge (40) of claim 1, wherein the second portion (52) projects axially out of the internal cavity of the filter wall (43) on an opposite side with respect to the first portion (51).

4. The filter cartridge (40) of claim 1, wherein the conductive strip (50) comprises an elongate body arranged with a longitudinal axis thereof substantially parallel to the longitudinal axis of the longitudinal core (45).

5. The filter cartridge (40) of claim 1, further comprising at least a pair of the conductive strips (50).

6. The filter cartridge of claim 5, wherein the conductive strips (50) of the pair of conductive strips (50) are electrically isolated from one another.

7. The filter cartridge (40) of claim 5, wherein the conductive strips (50) of the pair of conductive strips (50) are electrically connected to one another by means of at least a resistor (55) fixed to the longitudinal core (45).

8. The filter cartridge (40) of claim 5, wherein the first portions (51) of the conductive strips (50) of the pair of conductive strips (50) are axially at a same height as each other, while the second portions (52) of the conductive strips (50) of the pair of conductive strips (50) are axially at different heights than one another.

9. The filter cartridge (40) of claim 1, wherein the conductive strip (50) exhibits at least a portion (53) having a longitudinal axis substantially arranged in a radial direction that is sunk or inserted in the longitudinal core (45).

10. The filter cartridge (40) of claim 1, wherein the longitudinal core (45) is removably associated to the filter wall (43).

11. The filter cartridge (40) of claim 1, wherein at least a net (46) is fixed to the longitudinal core (45), said net (46) is able to separate water from the diesel fuel, in such a way as to occlude the radial openings (450).

12. A filter group (10) comprising:
an external casing (20) provided with at least an inlet (22) of a fluid to be filtered, and at least an outlet (23) of the fluid to be filtered;
a filter cartridge (40), according to claim 1, contained internally of the casing (20), such that the filter wall (43) is crossed by the fluid which flows from the inlet (23) towards the outlet (24) and the first portion (51) of the conductive strip (50) is the lower end of the conductive strip (50) proximal to the bottom of the casing (20),
and at least an electrical contact (33, 332) of a water sensor in the diesel fuel (30) associated to the casing (20),
wherein the second portion (52) of the conductive strip (50) is able to come into contact with the at least an electrical contact (331, 332), when the filter cartridge (40) is contained internally of the casing (20), in such a way that the conductive strip (50) axially prolongs the electrical contact (331, 332).

13. The group (10) of claim 12, wherein the electrical contact (331, 332) is supported by a stem (32) inserted in the internal cavity of the longitudinal core (50).

14. The group (10) of claim 12, wherein the electrical contact (331, 332) or the second portion (52) comprises an annular body made of an electrically conductive material.

15. The group (10) of claim 12, wherein the water level sensor in the diesel fuel (30) comprises a pair of the electrical contacts (331, 332) electrically isolated from one another.

16. The group (10) of claim 15, wherein the electrical contacts (331, 332) of the pair of electrical contacts (331, 332) are located axially at different heights internally of the casing (20).

* * * * *